United States Patent Office 3,657,441
Patented Apr. 18, 1972

3,657,441
METHOD OF INHIBITING THE FORMATION OF PHENYLETHANOLAMINE N-METHYL TRANSFERASE WITH IMIDAZOLES
Norman P. Jensen, Watchung, and Tsung-Ying Shen and Thomas B. Windholz, Westfield, N.J., assignors to Merck & Co., Inc., Rahway, N.J.
No Drawing. Continuation-in-part of application Ser. No. 8,011, Feb. 2, 1970. This application July 30, 1970, Ser. No. 59,763
Int. Cl. A61k 27/00
U.S. Cl. 424—273                                    1 Claim

ABSTRACT OF THE DISCLOSURE

New 4-phenylimidazoles and 2,4-bis-phenylimidazoles useful in the inhibition of phenylethanolamine-N-methyl transferase.

This application is a continuation-in-part of U.S. Ser. No. 8,011, filed Feb. 2, 1970, now abandoned.
This invention relates to new chemical compounds. More specifically, this invention relates to new phenyl imidazoles. Still more specifically, this invention relates to compounds having the following general formula:

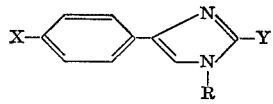

wherein R is hydrogen or loweralkyl; X is hydrogen trifluoromethyl, halo or nitro; and Y is hydrogen or

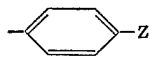

wherein Z is halo, trifluoromethyl or nitro provided that R may not be hydrogen when Y or both X and Y are hydrogen.

A final step in epinephrine biosynthesis is the transfer of a methyl group from S-adenosylmethionine to the amine nitrogen of norephinephrine. This step is catalyzed by phenylethanolamine - N - methyl transferase. Accordingly, the inhibition of phenylethanolamine - N - methyl transferase will result in a decrease in the formation of adrenal epinephrine.

These compounds have clinical utility in situations where there is a selective overproduction of adrenal epinephrine such as in the treatment of narcotic addition, for example the management and control of morphine withdrawal, the treatment of various emotional states, for example anticipatory, painful and anxiety states in normal and psychiatric subjects, in particular, for the treatment of anxiety neurosis, and the prophilactic control of cardiovascular disorders characterized by increased heart rate and cardiac output, management of heart failure, cardiac shock or other situations in which stress exerts pressure upon cardiac performance, as for example, the management of myocardial infractions.

The compounds of this invention also are useful as fungicides and coccidiostats and may be used to treat diseases and conditions characterized by the presence of coccidia or fungi.

This invention further relates to methods of inhibiting the formation of phenylethanolamine-N-methyl transferase utilizing pharmaceutical compositions containing as an active ingredient compounds having the following general formula:

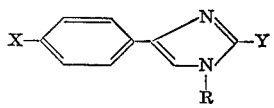

wherein R is hydrogen or loweralkyl; X is hydrogen, trifluoromethyl, halo or nitro; and Y is hydrogen or

wherein Z is halo, trifluoromethyl or nitro.

The compounds of this invention may be prepared by the procedure illustrated in the following flow sheet.

FLOW SHEET I

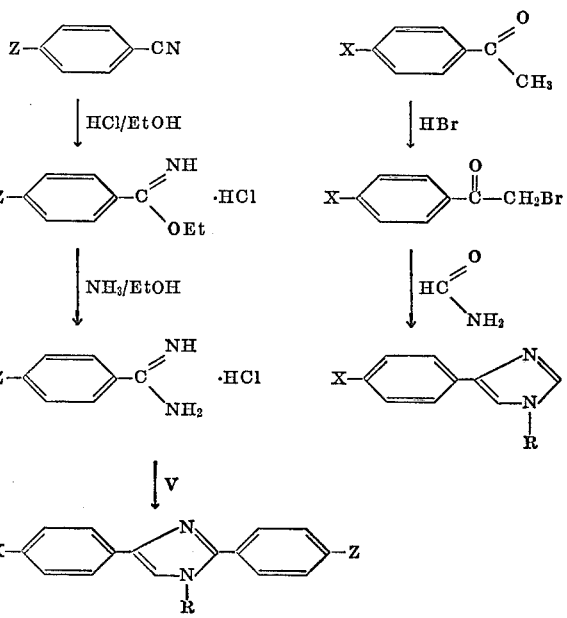

Equivalents:
X may be hydrogen, halo, trifluoromethyl or nitro;
Z may be halo, trifluoromethyl or nitro; and
R may be hydrogen or loweralkyl.

In the preparation of the compounds of this invention, the starting material is an α-bromo-4-substituted acetophenone. This compound may be prepared by brominating an acetophenone by the procedure of J. Am. Chem. Soc., 75, 5884 (1953). The brominated acetophenones are then reacted with formamide to yield the 4-phenylimidazoles of this invention. The 2,4-bis-phenylimidazoles may be prepared by reacting the brominated acetophenones with a benzylamidine compound.

A preferred embodiment of this invention is a method of inhibiting dopamine β-hydroxylase which comprises the administration of a therapeutically effective amount of the compounds of Formula II to patients (animal or human). In general the daily dose can be from 0.05 mg./kg. to 150 mg./kg. per day and preferably from 1 mg./kg. to 100 mg./kg. per day, bearing in mind, of course, that in selecting the appropriate dosage in any specific case, consideration must be given to the patient's weight, general health, metabolism, age and other factors which influence response to the drug.

Another embodiment of this invention is the provision of pharmaceutical compositions in dosage unit form which comprise from about 1 mg. to 500 mg. of a compound of Formula II.

The pharmaceutical compositions may be in a form suitable for oral use, for example, as tablets, aqueous or oily suspensions, dispersible powders or granules, emulsions, hard or soft capsules, or syrups or elixirs. Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide a pharmaceutically elegant and palatable preparation. Tablets contain the active imidazole ingredient in admixture with non-toxic pharmaceutically acceptable excipients which are suitable for manufacture of tablets. These excipients may be, for example, inert diluents, for example calcium carbonate, sodium carbonate, lactose, calcium phosphate or sodium phosphate; granulating and disintegrating agents, for example maize starch, or alginic acid; binding agents, for example starch, gelatin or acacia, and lubricating agents, for example magnesium stearate, stearic acid or talc. The tablets may be uncoated or they may be coated by known techniques to delay disintegration and absorption in the gastrointestinal tract and thereby provide a sustained action over a longer period.

Formulations for oral use may also be presented as hard gelatin capsules wherein the active ingredient is mixed with an inert solid diluent, for example calcium carbonate, calcium phosphate or kaolin, or as soft gelatin capsules wherein the active ingredient is mixed with an oil medium, for example arachis oil, liquid paraffin or olive oil.

Aqueous suspensions contain the active imidazoles in admixture with excipients suitable for the manufacture of aqueous suspensions. Such excipients are suspending agents, for example sodium carboxymethylcellulose, methylcellulose, hydroxypropylmethylcellulose, sodium alginate, polyvinylpyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxy-cetanol, or condensation products of ethylene oxide with partial esters derived from fatty acids and a hexitol, for example polyoxyethylene sorbitol mono-oleate, or condensation products of ethylene oxide with partial esters derived from fatty acids and hexitol anhydrides, for example polyoxyethylene sorbitan mono-oleate. The said aqueous suspensions may also contain one or more preservatives, for example, ethyl, or n-propyl, p-hydroxy benzoate, one or more coloring agents, one or more flavoring agents and one or more sweetening agents, such as sucrose, saccharin, or sodium or calcium cyclamate.

Oily suspensions may be formulated by suspending the active ingredient in a vegetable oil, for example arachis oil, olive oil, sesame oil or coconut oil, or in a mineral oil such as liquid paraffin. The oily suspensions may contain a thickening agent, for example beeswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavoring and coloring agents, may also be present.

The pharmaceutical compositions of the invention may also be in the form of oil-in-water emulsions. The oily phase may be a vegetable oil, for example olive oil or arachis oils, or a mineral oil, for example liquid paraffin or mixtures of these. Suitable emulsifying agents may be naturally-occurring gums, for example gum acacia or gum tragacanth, naturally-occurring phosphatides, for example soya bean lecithin, and esters of partial esters derived from fatty acids and hexitol anhydrides, for example sorbitan mono-oleate, and condensation products of the said partial esters with ethylene oxide, for example polyoxyethylene sorbitan mono-oleate. The emulsions may also contain sweetening and flavoring agents.

Syrups and elixirs may be formulated with sweetening agents, for example glycerol, sorbitol or sucrose. Such formulations may also contain a demulcent, a preservative and flavoring and coloring agents. The pharmaceutical compositions may be in the form of a sterile injectable preparation, for example as a sterile injectable aqueous suspension. This suspension may be formulated according to the known art using these suitable dispersing or wetting agents and suspending agents which have been mentioned above. The sterile injectable preparation may also be a sterile injectable solution or suspension in a non-toxic parenterally-acceptable diluent or solvent, for example as a solution in 1:3-butane diol.

The pharmaceutical compositions may be tableted or otherwise formulated so that for every 100 parts by weight of the composition there are present between 5 and 95 parts by weight of the active ingredient and preferably between 25 and 85 parts by weight of the active ingredient. The dosage unit form will generally contain between about 100 mg. and about 500 mg. of the active ingredient of the formula stated above.

From the foregoing formulation discussion it is apparent that the compositions of this invention can be administered orally or parenterally. The term parenteral as used herein includes subcutaneous injection, intravenous, intramuscular, or intrasternal injection or infusion techniques.

The following examples are presented to further illustrate the invention.

EXAMPLE 1

(A) p-Trifluoromethylbenzo - 1 - ethoxyformimide hydrochloride: A mixture of 17.1 g. of p-trifluoromethylbenzonitrile and 25 ml. of dry ethanol is stirred and cooled in an ice-bath before 75 ml. of cold ethanol saturated with HCl is added slowly. After standing 4 days at 45° the ethanol is removed in vacuo until a white slush is obtained and 100 ml. of ether is added. The resultant precipitate is collected, yielding p-trifluoromethylbenzo-1-ethoxyformimide hydrochloride, M.P. 185–186°.

(B) p-Chlorobenzo-1-ethoxyformimide hydrochloride: The reactions of Example 1A are repeated except that the starting materials are p-chlorobenzonitrile and ethanol.

Using the same reaction conditions and techniques there is obtained p-chlorobenzo-1-ethoxyformimide hydrochloride.

(C) p-Nitrobenzo - 1-ethoxyformimide hydrochloride: The reactions of Example 1A are repeated except that the starting materials are p-nitrobenzonitrile and ethanol. Using the same reaction conditions and techniques there is obtained p-nitrobenzo-1-ethoxyformimide hydrochloride.

(D) When p - fluorobenzonitrile and p - bromobenzonitrile are used in the above procedure, the corresponding imides are obtained.

EXAMPLE 2

(A) p-Trifluoromethylbenzoamidine hydrochloride: To a solution of 7.5 g. of p-trifluoromethyl-benzo-1-ethoxyformimide hydrochloride in 40 ml. of dry ethanol is added 1½ ml. portions of a ~5% solution of ammonia. The portions are added over a 2½ day period and are continued until an odor of ammonia persists. The mixture is then filtered and concentrated in vacuo to give p-trifluoromethylbenzoamidine hydrochloride.

(B) p-Fluorobenzoamidine hydrochloride: The reactions of Example 2A are repeated except that the starting materials are p-fluorobenzo - 1 - ethoxyformimide hydrochloride and ammonia. Using the same reaction conditions and techniques, there is obtained p-fluorobenzoamidine hydrochloride.

(C) Reacting the other imides of Example 1 according to the procedure of Example 2A, there is obtained the corresponding amidine.

EXAMPLE 3

(A) 4-(4'-trifluoromethylphenyl)-imidazole: A 30 g. portion of α - bromo - 4 - trifluoromethyl-acetophenone is heated with 15 ml. of formamide for 2 hours at 175–185°. After cooling the mixture is dissolved in hot aqueous hydrochloric acid at a pH of 2. The resultant solution is decolorized with activated charcoal. The pH is then adjusted to 8 with ammonia and crude product is collected. Purification is achieved by sublimation at 120°/0.6 mm., yielding 4 - (4' - trifluoromethylphenyl)-imidazole, M.P. 151–151.5°.

(B) 4-(4'-chlorophenyl)-imidazole: The reactions of Example 3A are repeated except that the starting materials are α-bromo-4-chloroacetophenone and formamide. Using the same reaction conditions and techniques, there is obtained 4-(4'-chlorophenyl)-imidazole, M.P. 146–147.6°.

(C) 4-(4'-nitrophenyl)-imidazole: The reactions of Example 3A are repeated except that the starting materials are α-bromo-4-nitroacetophenone and formamide. Using the same reaction conditions and techniques there is obtained 4-(4'-nitrophenyl)-imidazole, M.P. 225°.

(D) 4-phenylimidazole: The reactions of Example 3A are repeated except that the starting materials are α-bromoacetophenone and formamide. Using the same reaction conditions and techniques there is obtained 4-phenylimidazole.

EXAMPLE 4

(A) 1 - methyl-4-(4'-trifluoromethylphenyl)-imidazole: A 53.3 g. portion of 4-(4'-trifluoromethylphenyl)-imidazole is mixed with 26 ml. of dimethylsulfate. The resultant melt is heated and stirred on a steam-bath for 25 minutes. After cooling the mixture is taken up in 1.5 l. of water and the pH is adjusted to 10 with 10% sodium hydroxide. The resultant mixture is extracted with chloroform and the chloroform layers are dried with sodium sulfate and concentrated in vacuo. The residue is extracted well with ether. The ether extract is chromatographed on 1 kg. of silica gel using 6% methanol in chloroform as an eluant. Fractions containing product are combined and recrystallized from ether to give 1-methyl-4-(4'-trifluoromethylphenyl)-imidazole, M.P. 145–146°.

(B) The reactions of Example 4A are repeated using the imidazoles of Example 3. Using the same reaction conditions and techniques as in Example 4A, there is obtained the corresponding 1-methyl-4-phenylimidazole.

EXAMPLE 5

(A) 2,4 - bis - (4'-trifluoromethylphenyl)-imidazole: A two-phase mixture of 3.2 g. of α-bromo-4-trifluoromethylacetophenone in 23 ml. of chloroform and 2.54 g. of p-trifluoromethylbenzoamidine hydrochloride in 15 ml. of water is stirred and 1.5 g. of potassium hydroxide (assay 85% or better) in 10 ml. of water is added. The mixture is refluxed and stirred vigorously for 3 hours. After cooling, the organic layer is separated and added to chloroform washings of the aqueous layer. The combined organic layers are then dried with magnesium sulfate and concentrated in vacuo to a yellow solid which is recrystallized from 15 ml. of benzene to give crude product, M.P. 188–191°. An analytical sample of 2,4-bis-(4'-trifluoromethylphenyl)-imidazole is obtained by recrystallization from benzene followed by sublimation at 180°/5 M., M.P. 190–192°.

(B) The reactions of Example 5A are repeated using the amidine hydrochlorides of Example 2 and the acetophenones used in the procedure of Example 3. Using the same reaction conditions and techniques as in Example 5A the corresponding biphenylimidazoles are obtained.

EXAMPLE 6

(A) 1 - methyl-2,4-bis-(4'-trifluoromethylphenyl)imidazole: To a 178 ml. portion of 2,4-bis-(4'-trifluoromethylphenyl)-imidazole is added 0.08 ml. of dimethylsulfate. The mixture is stirred and warmed on a steam bath for 10 minutes. The resultant mixture is taken up in chloroform and water containing excess sodium hydroxide. The organic layer is separated, dried with sodium sulfate and concentrated in vacuo to an oil which is chromatographed on 1,000μ silica gel plates to yield 1-methyl-2,4-bis-(4'-trifluoromethylphenyl)-imidazole, M.P. 90–92°.

(B) The reactions of Example 6A are repeated using the biphenylimidazoles produced by Example 5 and dimethylsulfate as starting materials. Using the same reaction conditions and techniques, there is obtained the corresponding 1-methyl-2,4-bis-(biphenyl)-imidazole.

EXAMPLE 7

A mixture of 250 parts of 1-methyl-4-(4'-trifluoromethylphenyl)-imidazole and 25 parts of lactose is granulated with suitable water, and to this is added 100 parts of maize starch. The mass is passed through a 16-mesh screen. The granules are dried at a temperature below 60° C. The dry granules are passed through a 16-mesh screen, and mixed with 3.8 parts of magnesium stearate. They are then compressed into tablets suitable for oral administration.

EXAMPLE 8

A mixture of 50 parts of 2,4-bis-(4'-trifluoromethylphenyl)-imidazole, 3 parts of the calcium salt of lignin sulphonic acid, and 237 parts of water is ball-milled until the size of substantially all of the particles of benzyl ethyl sulfoxide is less than 10 microns. The suspension is diluted with a solution containing 3 parts of sodium carboxymethylcellulose and 0.9 part of the butyl ester of p-hydroxybenzoic acid in 300 parts of water. There is thus obtained an aqueous suspension suitable for oral administration for therapeutic purposes.

EXAMPLE 9

A mixture of 250 parts of 1-methyl-4,(4'-chlorophenyl)-imidazole, 200 parts of maize starch and 30 parts of alginic acid is mixed with a sufficient quantity of a 10% aqueous paste of maize starch, and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 10

A mixture of 500 parts of 1-methyl-2,4-bis-(4'-nitrophenyl)-imidazole, 60 parts of maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

What is claimed is:

1. A method of inhibiting the formation of phenylethanolamine N-methyl transferase comprising the administration to a patient requiring such treatment of a therapeutically effective amount of a compound of the formula:

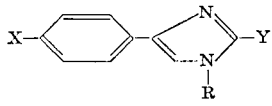

wherein R is hydrogen or loweralkyl; X is hydrogen, halo, trifluoromethyl or nitro; and Y is hydrogen or

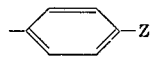

wherein Z is halo, trifluoromethyl or nitro.

References Cited

Hazedine et al.: J. Chem. Soc. London, vol. 125, p. 1438 (1924).

Dodson et al.: J. Am. Chem. Soc., vol. 72, pp. 1478–1480 (1950).

Ellis et al.: J. Pharm. Pharmacology, vol. 16, pp. 400–407 (1964).

Kreig et al.: Chem. Ber., vol. 100, pp. 4042–4049 (1967).

Bredereck et al.: Chem. Abst., vol. 53, cols. 12281–12282 (1959).

Bredereck et al.: Chem. Ber., vol. 92, pp. 338–343 (1959).

Gompper et al.: Chem. Abst., vol. 53, cols. 13139–13142 (1959).

Gompper et al.: Chem. Ber., vol. 92, pp. 550–563 (1959).

STANLEY J. FRIEDMAN, Primary Examiner

U.S. Cl. X.R.

260—309